United States Patent
Martell et al.

(10) Patent No.: US 11,388,483 B2
(45) Date of Patent: Jul. 12, 2022

(54) INTERACTION OVERLAY ON VIDEO CONTENT

(71) Applicant: Martell Broadcasting Systems, Inc., Brooklyn, NY (US)

(72) Inventors: Carey Ray Martell, San Marcos, TX (US); Akim Angelo Anastopoulo, Charleston, SC (US)

(73) Assignee: MARTELL BROADCASTING SYSTEMS, INC., Brooklyn, NY (US)

( * ) Notice: Subject to any disclaimer, the term of this patent is extended or adjusted under 35 U.S.C. 154(b) by 0 days.

(21) Appl. No.: 15/992,106

(22) Filed: May 29, 2018

(65) Prior Publication Data

US 2019/0373337 A1 Dec. 5, 2019

(51) Int. Cl.

| | |
|---|---|
| *G06F 3/00* | (2006.01) |
| *G06F 13/00* | (2006.01) |
| *H04N 5/445* | (2011.01) |
| *H04N 21/81* | (2011.01) |
| *H04N 21/478* | (2011.01) |
| *H04N 21/475* | (2011.01) |
| *H04N 21/4725* | (2011.01) |

(52) U.S. Cl.
CPC ......... *H04N 21/812* (2013.01); *H04N 21/475* (2013.01); *H04N 21/4725* (2013.01); *H04N 21/47815* (2013.01)

(58) Field of Classification Search
CPC ............. H04N 21/812; H04N 21/4725; H04N 21/475; H04N 21/47815
See application file for complete search history.

(56) References Cited

U.S. PATENT DOCUMENTS

| | | | |
|---|---|---|---|
| 8,521,899 B2 | 8/2013 | Narula | |
| 9,258,589 B2 | 2/2016 | Grouf | |
| 9,699,515 B2 | 7/2017 | Grouf | |
| 9,712,884 B2 | 7/2017 | Grouf | |
| 2008/0163283 A1* | 7/2008 | Tan | H04N 7/163 |
| | | | 725/20 |

(Continued)

FOREIGN PATENT DOCUMENTS

| | | |
|---|---|---|
| WO | 2015123572 A1 | 8/2015 |
| WO | 2018009408 A2 | 1/2018 |

OTHER PUBLICATIONS https://www.indiegogo.com/projects/martell-tv-mobile-video-view-application#/; Indiegogo, Martell TV—Mobile Video View application; downloaded May 14, 2018.

*Primary Examiner* — Kyu Chae
(74) *Attorney, Agent, or Firm* — Bryan L. Baysinger; Nexsen Pruet, LLC

(57) ABSTRACT

In this application, methods of facilitating serving advertisements to users are described. Methods of the inventive subject matter allow for delivery of advertisement videos, both in the form of commercials and in the form of product placement, such that users can interact with one or more buttons that are included in an interactive overlay on the advertisement video. Buttons in an interactive overlay can prompt a user to provide an input to a client to bring about a desired effect, e.g., to make a purchase or to request more information. Interaction with a button does not cause an interruption in any video content that includes an interactive overlay prompting a user for input.

8 Claims, 3 Drawing Sheets

(56) References Cited

U.S. PATENT DOCUMENTS

| | | | |
|---|---|---|---|
| 2009/0013347 A1* | 1/2009 | Ahanger | G06Q 30/02 |
| | | | 725/36 |
| 2009/0228920 A1 | 9/2009 | Tom | |
| 2009/0320059 A1* | 12/2009 | Bolyukh | H04N 21/44016 |
| | | | 725/32 |
| 2011/0125582 A1* | 5/2011 | Datta | G06Q 30/02 |
| | | | 705/14.55 |
| 2012/0303466 A1* | 11/2012 | Boskovich | G06Q 30/0241 |
| | | | 705/14.72 |
| 2014/0109118 A1* | 4/2014 | Kokenos | G06Q 30/02 |
| | | | 725/5 |
| 2014/0229277 A1* | 8/2014 | Khambete | G06Q 30/02 |
| | | | 705/14.52 |
| 2015/0106856 A1* | 4/2015 | Rankine | H04N 21/4725 |
| | | | 725/60 |
| 2016/0140549 A1* | 5/2016 | Hurry | G06Q 20/085 |
| | | | 705/71 |
| 2016/0173961 A1* | 6/2016 | Coan | H04N 21/812 |
| | | | 725/32 |
| 2016/0259464 A1* | 9/2016 | Chan | G06F 3/0481 |
| 2018/0014076 A1 | 1/2018 | Shanson | |
| 2018/0014077 A1 | 1/2018 | Hou | |
| 2018/0295408 A1* | 10/2018 | Wu | H04N 21/435 |

\* cited by examiner

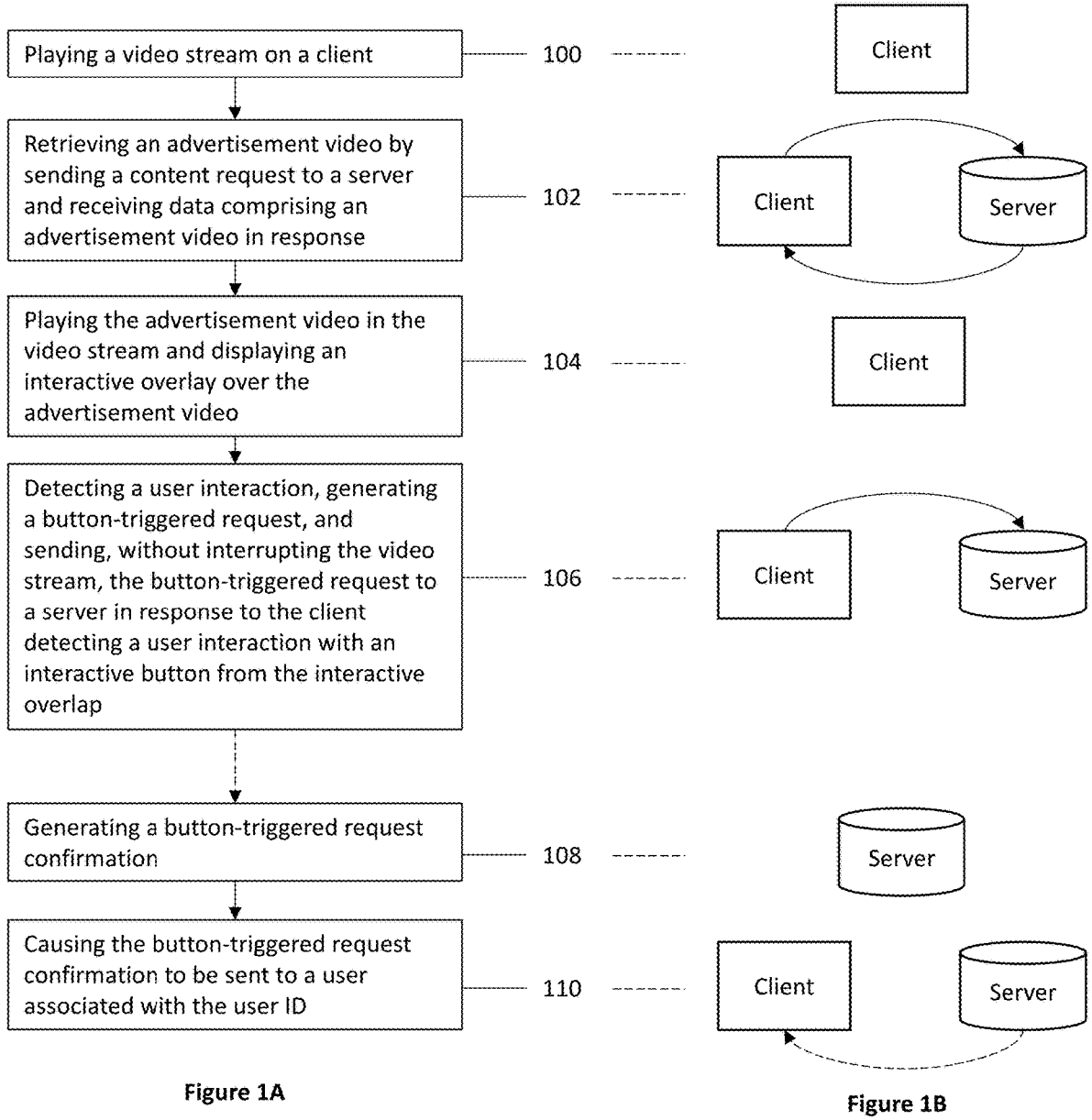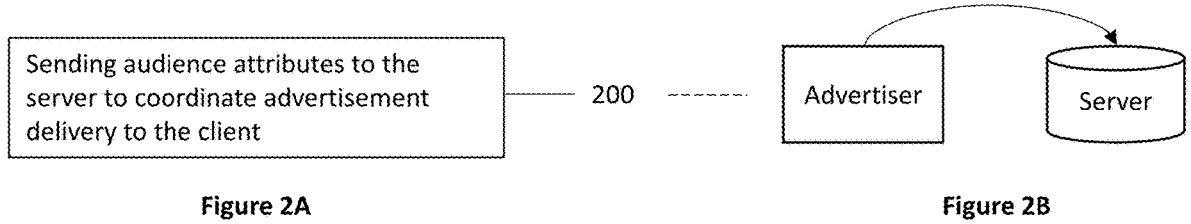

| | |
|---|---|
| Generating an advertisement campaign by sending advertisement campaign information to a server — 300 |  |
| Figure 3A | Figure 3B |

| | |
|---|---|
| Playing a video stream on a client — 400 | 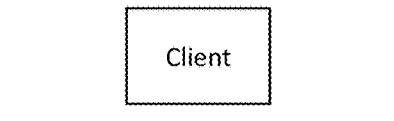 |
| ↓ | |
| Playing a video segment in the video stream and displaying an interactive overlay over the video segment — 402 | 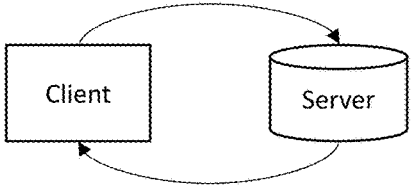 |
| ↓ | |
| Playing the advertisement video in the video stream and displaying an interactive overlay over the advertisement video — 404 |  |
| ↓ | |
| Sending, without interrupting the video stream, a button-triggered request to a server in response to the client detecting a user interaction with an interactive button from the interactive overlay — 406 | 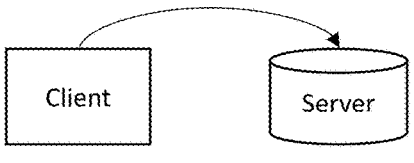 |
| ↓ | |
| Generating a purchase request confirmation — 408 | 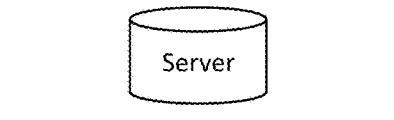 |
| ↓ | |
| Causing the purchase request confirmation to be sent to an electronic address associated with the user ID — 410 | 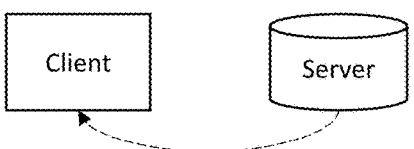 |
| Figure 4A | Figure 4B |

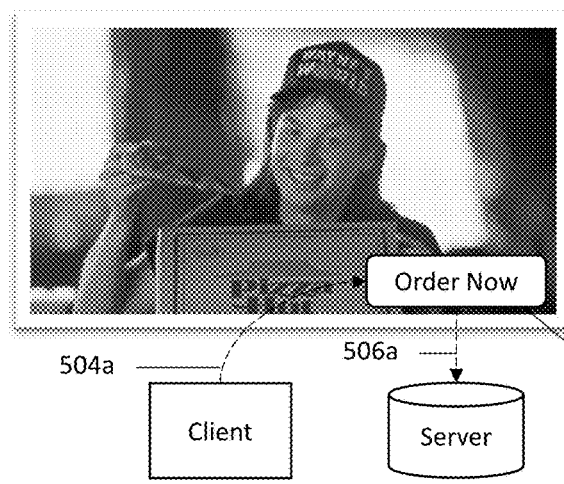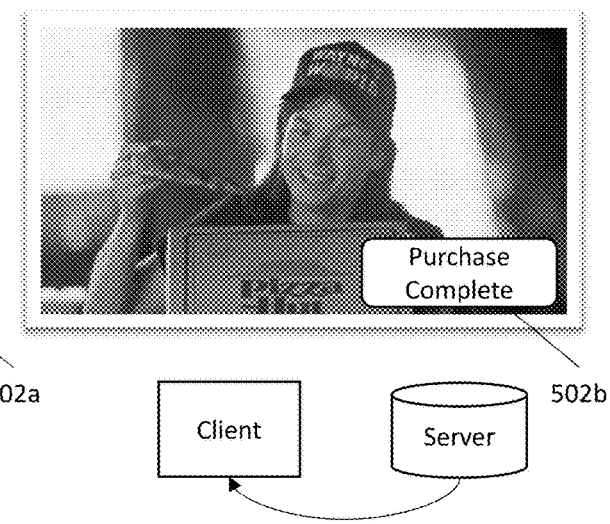
Figure 5A
Figure 5B

INTERACTION OVERLAY ON VIDEO CONTENT

FIELD OF THE INVENTION

The field of the invention is advertising content and engagement.

BACKGROUND

The background description includes information that may be useful in understanding the present invention. It is not an admission that any of the information provided in this application is prior art or relevant to the presently claimed invention, or that any publication specifically or implicitly referenced is prior art.

For decades, television advertising has been a major source of revenue for channel operators. As the internet has risen to prominence in the delivery of video content to consumers, advertising has followed. Many services that offer streaming content online also sell advertising spots. One good example is YouTube: when accessing a YouTube video, frequently an advertisement will play before the video. Advertising can also come as product placement within content that itself is not otherwise an advertisement.

But including advertisements in streaming content has a major drawback: interacting with a video advertisement causes interruption in the video. For example, the video can be paused, full screen exited, a new tab or window in a browser opened, etc., all of which interrupt a viewing experience. Although improvements in advertisement delivery have been made, those improvements fail to contemplate improvements that would eliminate video interruption while still allowing for direct interaction with an advertisement to, for example, make a purchase or request more information about the subject of an advertisement.

Thus, there is still a need in the art for improved methods of facilitating user interaction with advertisements.

SUMMARY OF THE INVENTION

The present invention provides methods in which advertisement videos can be shown to users prompting user input, where the advertisement video is not interrupted upon receiving user input.

In one aspect of the inventive subject matter, a computer-implemented method of delivering advertisements is contemplated. The method includes the steps of: playing a video stream on a client, where the video stream comprises video data received from a server; sending, by the client, a content request to a first server associated with an ad video resource locator; receiving, from the first server, data comprising an advertisement video corresponding to an ad ID; playing, by the client, the advertisement video in the video stream; displaying, by the client, an interactive overlay over the advertisement video, wherein the interactive overlay includes a product-interaction button; detecting, by the client, a user interaction with the product-interaction button and generating, in response to the detection, a purchase request includes one or any combination of a user ID, the ad ID, and an engagement type; and sending, to a second server, the purchase request. In these methods, user interaction with a product-interaction button does not cause interruption of the playing of the video stream on the client.

In some embodiments, the additional steps of generating, by the second server, a purchase request confirmation and causing, by the second server, the purchase request confirmation to be sent to an electronic address associated with the user ID are also included. It is contemplated that the purchase request can further comprise an ad name and a sponsor name.

In some embodiments, the additional step of sending an audience attribute to the first server is included. The first server can then select an advertisement video based at least in part on the audience attribute, and the audience attribute can include one, or any combination of: a geographic location attribute; an age attribute; and an expected interest attribute.

In some embodiments, the engagement type is defined as at least one of: an instant-buy type (e.g., one user interaction leads to a purchase), a buy-later type (e.g., a user interaction leads to adding an item to a shopping cart to be accessed later for completing a purchase), or a save type (e.g., a user interaction leads to saving information about the advertisement).

In another aspect of the inventive subject matter, another computer-implemented method of delivering advertisements is contemplated. The method includes the steps of: playing a video stream on a client, wherein the video stream comprises video data received from a server; sending, by the client, a content request to a first server associated with an ad video resource locator; receiving, from the first server, data comprising an advertisement video corresponding to an ad ID; playing, by the client, the advertisement video in the video stream; displaying, by the client, an interactive overlay over the advertisement video, where the interactive overlay includes a product-interaction button; detecting, by the client, a user interaction with the product-interaction button, where the user interaction comprises input to a peripheral device coupled with the client, and generating, in response to the detection, a purchase request that includes one or any combination of a user ID, the ad ID, and an engagement type; and sending, to a second server, the purchase request. In these methods, user interaction with a product-interaction button does not cause interruption of the playing of the video stream on the client.

In some embodiments, the additional steps of generating, by the second server, a purchase request confirmation and causing, by the second server, the purchase request confirmation to be sent to an electronic address associated with the user ID are also included. It is contemplated that the purchase request can further comprise an ad name and a sponsor name.

In some embodiments, the additional step of sending an audience attribute to the first server is included. The first server can then select an advertisement video based at least in part on the audience attribute, and the audience attribute can include one, or any combination of: a geographic location attribute; an age attribute; and an expected interest attribute.

In some embodiments, the engagement type is defined as at least one of: an instant-buy type (e.g., one user interaction leads to a purchase), a buy-later type (e.g., a user interaction leads to adding an item to a shopping cart to be accessed later for completing a purchase), or a save type (e.g., a user interaction leads to saving information about the advertisement).

It is contemplated that the engagement type can indicate whether an engagement is to cause a purchase or to cause delivery of more information about a product, etc.

In another aspect of the inventive subject matter, another computer-implemented method of delivering advertisements is contemplated. The method includes the steps of: playing a video stream on a client, wherein the video stream comprises video data received from a server; playing, by the client, a video segment in the video stream and displaying an interactive overlay over the video segment, wherein the video segment has an associated ad ID and wherein the interactive overlay includes an interactive button; sending, to a server, a button-triggered request, the button-triggered request being sent as a result of the client detecting a user interaction with the interactive button and wherein the button-triggered request includes a user ID, the ad ID, and an engagement type. In these methods, user interaction with a product-interaction button does not cause interruption of the playing of the video stream on the client.

In some embodiments, the additional steps of generating, by the second server, a purchase request confirmation and causing, by the second server, the purchase request confirmation to be sent to an electronic address associated with the user ID are also included. It is contemplated that the purchase request can further comprise an ad name and a sponsor name.

In some embodiments, the additional step of sending an audience attribute to the first server is included. The first server can then select an advertisement video based at least in part on the audience attribute, and the audience attribute can include one, or any combination of: a geographic location attribute; an age attribute; and an expected interest attribute.

In some embodiments, the engagement type is defined as at least one of: an instant-buy type (e.g., one user interaction leads to a purchase), a buy-later type (e.g., a user interaction leads to adding an item to a shopping cart to be accessed later for completing a purchase), or a save type (e.g., a user interaction leads to saving information about the advertisement).

It is contemplated that the engagement type can indicate whether an engagement is to cause a purchase or to cause delivery of more information about a product, etc.

One should appreciate that the disclosed subject matter provides many advantageous technical effects including an ability to interact with an advertisement presented via video content without interrupting the video content.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a flowchart of one aspect of the inventive subject matter.

FIG. 1B shows client-server interactions according to the method shown in FIG. 1A.

FIG. 2A is a flowchart of an additional step that can be included in methods of the inventive subject matter.

FIG. 2B shows client-server interactions according to the additional step shown in FIG. 2A.

FIG. 3A is a flowchart of an additional step that can be included in methods of the inventive subject matter.

FIG. 3B shows client-server interactions according to the additional step shown in FIG. 3A.

FIG. 4A is a flowchart of another aspect of the inventive subject matter.

FIG. 4B shows client-server interactions according to the method shown in FIG. 4A.

FIG. 5A shows an interactive overlay presented on a product-placement style advertisement before user interaction, including resulting client server interactions.

FIG. 5B shows an interactive overlay presented on a product-placement style advertisement after user interaction, including resulting client server interactions.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

The inventive subject matter is directed to systems and methods of delivering advertisements in the course of delivering streaming video content. It is contemplated that advertisements—whether the advertisement is product placement within a program, a stand-alone advertisement, or otherwise—can be delivered to a consumer with an interactive overlay over the video that prompts the consumer to interact with the overlay to bring about an effect. The effect can be, for example, making a purchase or requesting more information (e.g., by clicking a "buy now" button or a "request information" button that is included with the overlay).

In this application, the term "server" is used in references to multiple steps of methods of the inventive subject matter. It is contemplated that one or more servers can undertake any of the tasks (e.g., carry out method steps) described in this application, and it is possible for different servers or groups of servers to be used for different methods steps or groups of method steps, as needed. For example, if a method uses a first sever, a second server, and a third server (and any number of servers beyond three, as well), it is contemplated that the first, second, and third servers can all be the same server, or they can all be different servers. It is also contemplated that, for example, a first server and a second server can be the same server with a third server being distinct form the first and second, or any other possible grouping depending on the number of servers involved in a method of the inventive subject matter.

When a user interacts with an overlay, the streaming content—whether an advertisement, a TV show that includes product placement, or otherwise—the streaming content is uninterrupted by the interaction. Instead, when a user (e.g., a consumer) interacts with the interactive overlay, the requested action (e.g., buy now or request more information) takes place behind the scenes so that the user's viewing experience is uninterrupted. In one example, if a user is being shown an advertisement for deodorant, and they wish to make a purchase, the user can click a "Buy Now" button that is included in an interactive overlay that is associated with the deodorant advertisement. When the "Buy Now" button is clicked, one or more servers interact behind the scenes to process a purchase on behalf of that user in such a way that the user's viewing experience is never interrupted (e.g., the user is never redirected to another website away from the streaming content, the user's browser does not open another tab or window, the user's content is not taken out of full screen, a mobile device client does not change to a different app, etc.).

FIGS. 1A-1B represent show how some embodiments of the inventive subject matter function. Embodiments as shown in FIGS. 1A-1B include a product interaction button (e.g., a "Buy Now" button) that is included as a part of an interactive overlay that comes over an advertisement video that is delivered separately from the streaming content that a user initially came to access (e.g., a standalone advertisement in the form of a commercial break as opposed to a product placement within a show).

Methods of the inventive subject matter involve exchanging requests and responses between two or more of any of the following: a client computer, a service host, a content host, a server, where the service host and the content host are both run on a server or set of servers. In many of the figures, relevant interactions are shown in diagrams adjacent to corresponding flow charts describing details of those interactions.

In one aspect of the inventive subject matter, a computer-implemented method of delivering advertisements is contemplated. As shown in step 100, the method includes the step of playing a video stream on a client, where the video stream comprises video data received from a server. In these embodiments, the video stream can include streaming content that is accessed by the client from, for example, YouTube or another streaming content provider.

Delivery of streaming content can be coordinated by a service host, even if the streaming content itself is delivered directly to the client from one or more servers that are not controlled by the service host. For example, it is contemplated that a service host can operate and coordinate channels, where each channel has a content schedule. When a client accesses a channel, the client is then delivered streaming content according to that channel's schedule and the client's local time, where the streamlining content is played as a part of the video stream that is playing on the client.

It is contemplated that advertisement videos can be delivered in the client's video stream. To retrieve an advertisement video, an ad ID is used to identify which advertisement to play in the client's video stream. It is also contemplated that an ad video resource locator (e.g., a URL or other type of resource locator known in the art) can be used (either alone or in association with the ad ID) to retrieve the advertisement video. An advertisement video, as with most streaming content, can be delivered in packets, where each packet of data includes a chunk of encoded audio and video data that a client can then play in its video stream.

Using one or both of the ad video resource locator and the ad ID, the advertisement video can thus be retrieved for delivery to the client, as shown in step 102. This step can be accomplished by sending, by the client, a content request to a server, where the content request is associated with an ad video resource locator. In response, the client then receives, from that server, data comprising an advertisement video corresponding to an ad ID. It is contemplated that a service host can help coordinate these actions (e.g., by routing requests and responses between a client and a server, or, in some instances, the service host is the same computing device as the server or servers). For example, a client can access a channel that is organized according to a service host such that the service host coordinates retrieval of an advertisement video from one or more content hosting servers. In some embodiments, the service host delivers information to the client sufficient for the client to retrieve the advertisement video directly from a server or servers on which the advertisement video is hosted. In some embodiments, the server or server that hosts the advertisement video is the same as the service host.

Next, as shown in step 104, the client plays the advertisement video in the video stream while simultaneously displaying an interactive overlay. The overlay can be shown over the advertisement video for all or some portion of the duration of the advertisement video. It is contemplated that the interactive overlay can include one or more interactive components, which can include a button. A button, in this context, refers to a portion of a screen that can be interacted with via user input (e.g., touch or a mouse click), whether the button is visually delineated as a button or otherwise. In some embodiments, a button in an interactive overlay is visually displayed as an interactive component separate from the underlying advertisement video, while in other embodiments, it is contemplated that a button can visually blend in with the video over which the overlay exists.

It is also contemplated that a button in an interactive overlay for any method described in this application can include a prompt for user input via peripheral device (e.g., keyboard, a mouse, a controller, a remote, a wireless input device, etc.). For example, a button displayed by an interactive overlay can include wording to prompt a user to interact with a peripheral device such as "press Enter to purchase" or "press X for more information," thereby detecting user interaction from a peripheral rather than a more direct input (e.g., a touch on a touch screen).

In embodiments with a button that visually blends in with its environment, for example, the button can be a portion of a screen corresponding to an item that is shown within an advertisement video. In one example, a clothing advertisement can show several different articles of clothing (e.g., being worn by actors in the advertisement video or otherwise), and the interactive button can correspond to the area of the screen occupied by a rendering of the article of clothing. Thus, while watching a clothing advertisement, a user could tap or click on the articles of clothing they like. In some embodiments, the interactive button can be dynamically defined based on movements and changes in the video. It is also contemplated that the interactive buttons that are defined according to an item on a screen can be static (e.g., after an advertisement, the articles of clothing for sale can be displayed on the client's screen, inviting interaction and not requiring any dynamic changes to the size or shape of the interactive portions of the overlay).

When an interactive overlay includes buttons that are defined as regions of the screen corresponding to items that are rendered on the screen, it is contemplated that the interactive region can be manually defined by, for example, an advertiser responsible for creating the advertisement video. In some embodiments, the interactive region can be algorithmically defined according to, for example, a machine learning algorithm that has been trained to identify particular items. In still further embodiments, the interactive region can be defined according to a combination of algorithm and manual definition. For example, a machine learning algorithm could be trained to identify t-shirts. Thus, when an advertisement video is created to sell t-shirts, a machine learning algorithm could be used to identify all t-shirts in the advertisement video, and the t-shirts that are intended to be sold in that advertisement video can be identified by an advertisement manager so that when a t-shirt in the advertisement is interacted with via a button on the interactive overlay, the user that caused that interaction can be sent information about the t-shirt in the advertisement video.

Upon detecting an interaction with a button on an interactive overlay, the client then sends a button-triggered request to a server, as shown in step 106. A button-triggered request is generated after a user interacts with a button on the interactive overlay. When the client detects a user interaction, it then sends the button-triggered request to the server. The button-triggered request can include one or any combination of several different attributes, including: a user ID, an ad ID, an engagement type, and an item ID. It is also contemplated that the button-triggered request can include an ad name and a sponsor name.

A user ID allows a server to identify a user that is operating a client. For example, when a user clicks on a button to complete a purchase, the server needs to know who that user is so that it knows what credit card information to use and what address to send the purchased good to. A user ID can be associated with additional user information that is stored somewhere other than on the client (e.g., on a server), such as name, address, shipping address, billing address, credit card information, and so on. Thus, when a server receives a user ID, the server can identify and retrieve information about the user associated with that user ID.

An ad ID allows a server to identify which advertisement a user has interacted with. For example, if a Gap ad is playing, that advertisement has an associated ad ID, and by sending the ad ID with the request that results from user interaction with the interactive overlay, the server can identify that the user interacted with a Gap ad. This can be useful for, e.g., tracking statistics (e.g., number of interactions per advertisement), A/B testing for different ads, and helping to identify what goods or service a user wishes to purchase or learn more about by interacting with an interactive overlay displayed over an advertisement video.

An engagement type can indicate to a server how a user wishes to interact with a button on an interactive overlay. For example, if an interactive overlay includes two buttons, one that says, "buy now" and another that says, "get more information," and the user interacts with the "buy now" button, then the button-triggered request would include an engagement type indicating the user has interacted with the "buy now" button as opposed to the "get more information button." It is therefore contemplated that the button-triggered request can, for example, be manifested as a "buy now" request or as a "more information" request. In some embodiments, the button on an interactive overlay can, for example, cause a purchase to be made at a later date, or it can add an item to a shopping cart. As described below, in embodiments that include a "buy now" button, the button-triggered request can include information about a user that is sufficient to result in that user being billed for a purchase of the item shown off in an advertisement video or other video content featuring an item that can be purchased.

The engagement type attribute can also indicate a type of input the received from the interactive overlay. For example, the interactive overlay can include a type of button that requires a gesture input. Thus, in an embodiment having an interactive button that states "swipe to purchase," the button-triggered request will not be generated or sent until the interactive overlay detects that the button has received a swipe input.

An item ID can be used to identify an item in an advertisement video. In the context of this application, an item can refer to a good or service that is being advertised. It is contemplated that an advertisement videos can feature multiple items. For example, if an advertisement video features a scooter that it is selling, then the scooter can have an associated item ID, which can then be included in the button-triggered request. Based on the engagement type in that button-triggered request, the user can then, for example, get more information about—or purchase—the scooter based on the scooter's item ID.

While an advertisement video plays in a client's video stream and the interactive overlay is displayed, it is contemplated that a user's interaction with a button from the interactive overlay will not cause any interruption in video content delivery. Ordinarily, when a user interacts with a video, the user is immediately redirected away from a video upon interaction (e.g., the user is taken into a different app, a new window or tab is opened in the user's web browser, the user is taken out of a full screen experience, etc.), but methods of the inventive subject matter allow for user interaction without stopping, pausing, or otherwise directing the user away from the video. Frequently the video is paused, but even in instances where the video is not paused, it can be distracting when a new window or tab opens, which can cause a full screen video to exit full screen mode. Methods of the inventive subject matter are especially useful with product placement, allowing users to learn more about (or even purchase) a product in a show without having the show interrupted in any way. For example, in a home improvement show, an interactive overlay could come up each time the show features a different lighting fixture, allowing a user to learn more about each lighting fixture or even allowing the user to purchase the lighting fixture without interrupting the show at all.

Upon receiving the button-triggered request, several other steps can take place, as shown in steps 108 and 110. Because these steps are optional, they are connected to the main portion of the diagram in FIG. 1A by a dotted line. As shown in step 108, the server generates a button-triggered request confirmation. The button-triggered request confirmation is generated in response to the button-triggered request and serves to confirm receipt of the button-triggered request. The server, as shown in step 110, then causes the button-triggered request confirmation to be sent to the user by way of, for example, an email or text message. The button-triggered request confirmation can be sent to any type of electronic address, where the electronic address is associated with a user or group of users (e.g., a family account having multiple users) according to a user ID. The button-triggered request confirmation can include, for example, a receipt for a purchase, a purchase confirmation link (e.g., a link to click that causes a purchase to be made), additional information about an item, and so on.

In some embodiments, the step of sending audience attributes to the server is included, as shown in step 200 of FIGS. 2A & 2B. It is contemplated that a server can select an advertisement video for a client to play in a video stream based on all or a portion of the audience attributes. In these embodiments, a user having an associated user ID can also be associated with audience attributes. The audience attributes can include information related to the user that are relevant for advertising purposes. For example, the audience attributes can include one, or any combination of: a geographic location attribute; an age attribute; and an expected interest attribute (e.g., a manually or algorithmically determined user interest such as "sports" that is based on indirect information such as what websites the user has visited); web browsing information (e.g., browser history or device usage history such as what apps a user has used and statistics related to app usage); and a user-defined interest.

A geographic location attribute can include information about a user's location, a client's location, or both. For example, geographic location can be determined using an IP address, which is related to the client's location. It can alternatively or additionally include a location that is set by a user (e.g., a user manually inputs their location into a user profile). Location can be useful in determining whether a user should be shown a location-targeted advertisement.

An age attribute can include a user's age, as set by the user. Age can be useful in determining whether a user should be shown an age-targeted advertisement. An expected interest attribute can include information about what a user is expected to find interesting. For example, if a user visits skydiving webpages, the expected interest attribute includes "skydiving" as an expected interest. It is contemplated that an expected interest attribute can be determined indirectly through a user's actions, Facebook likes (and other similar indicators that are available for interaction with on various websites through various web services like Twitter, Instagram, etc.), web browsing history, and so on. One or more expected interest attributes can relate to a single user.

Web browsing history of a user can be included in a user's audience attributes. It is contemplated that web browsing history can be gathered using, for example, cookies that are stored within a web browser. User-defined interests can also be included in the audience attributes. A user-defined attribute is one that is self-selected by a user on a client machine. It can include interest information that is directly input by the user, or it can include interests that are directly indicated on a third-party website or server (e.g., information from a social media website where a user has indicated an interest can be included as a user-defined interest.

A user's age can include the user's age as indicated by the user, or it can include a predicted age that is determined by circumstantial evidence of a user's age, such as websites visited, people interacted with while online (e.g., ages of Facebook friends), previous purchases, etc.

In some embodiments, methods of the inventive subject matter can include additional steps directed toward setting up an advertisement. These steps contemplate an advertiser (e.g., a computer controlled by an individual or entity that desires to create an advertisement that can be delivered by methods described in this application) interacting with a server on which the service operates. It is contemplated that an "advertiser" can refer to the advertising entity directly, or it can refer to an individual or entity that is operating on behalf of an advertiser.

As shown in step 300 of FIGS. 3A & 3B, the server receives, from the advertiser (either directly or indirectly), a set of advertisement attributes corresponding to an advertisement. A set of advertisement attributes can include one, or any combination of, the following attributes: an ad name; a URL; a sponsor name; a subject line (e.g., an email subject line); body text; (e.g., email body text); an advertisement video resource having a corresponding set of video attributes, where the video attributes can include one, or any combination of an ad video name, an ad video duration, and an ad video resource locator. It is contemplated that one—or any combination—of the advertisement attributes can be included in a response that is generated and sent to a user after a user completes an interaction with a button on an interactive overlay.

An ad name can include a name of a particular advertisement or of the name of the advertising campaign that the advertisement belongs to, or both. It is contemplated that the ad name can be stored as string or in any other suitable data structure. A URL can be a link that directs a web browser to a webpage related to an item in an advertisement having a set of advertisement attributes. The webpage can be a purchase confirmation page, a page for more information about the item, a page where the item can be purchased, etc.

A sponsor name attribute can include a name of an advertiser. It is contemplated that the sponsor name can be stored as string or in any other suitable data structure. A subject line can include a pre-written subject line that can be included in, for example, a message transmitted to a user after the user interacts with a button from an interactive overlay. The message can be an email or any other type of electronic message.

A body text can include a pre-written block of text that can be included in, for example, a message transmitted to a user after the user interacts with a button from an interactive overlay, as described above with respect to a subject line.

Video attributes can include technical information about a video including one, or any combination of: resolution, format, audio technical information, video name, video duration, an ad video resource locator (e.g., a URL that directs a web browser to a video that is available for streaming).

In another aspect of the inventive subject matter, a method of delivering advertisements is contemplated where an advertisement can be integrated into, for example, an episode of a show (e.g., product placement). A method of this nature is shown in FIGS. 4A & 4B. As shown in step 400, a client plays a video stream, where the video stream comprises video data received from a content server. This is similar to the embodiments discussed above. A content server can be the same as a server (or set of servers) that run services implementing methods of the inventive subject matter, but it is also contemplated that a content server can be the same server (or part of the same group of servers) that are used to run services that implement methods of the inventive subject matter.

As shown in step 402, the client then plays, in the video stream, a video segment, where the video segment has an associated ad ID. It is contemplated that a video segment can be, for example, a portion of an episode of a show that features product placement. While playing that video segment (e.g., for all or a portion of the time that the video segment plays), the client displays an interactive overlay having at least one interactive button, as shown in step 404.

As shown in step 406, the client then sends in response to the client detecting a user interaction with an interactive button from the interactive overlay, a button-triggered request to a server without interrupting the playback of the video segment in the video stream.

As described above, the button-triggered request can include one, or any combination of: a user ID, an ad ID, an engagement type, and an item ID. It is also contemplated that the button-triggered request can include an ad name and a sponsor name. These attributes are discussed in more detail above.

FIGS. 5A & 5B show an example of how a user can interact with an advertisement in the form of product placement. When video content includes a product placement, an interactive overlay can be displayed that includes a button 502a that prompts a user to interact with the button 502a to bring about a desired result—in this case, the button 502a reads "order now" and prompts a user to press the button to order a pizza. When the button 502a is interacted with by a user as shown by dotted line 504a, the client sends a request to a server as shown by dotted line 506a and as described above in regard to the methods shown in FIGS. 1A & 1B and FIGS. 4A & 4B. Lines 504a and 506a are shown as dotted lines to give a visualization of how the client interacts with the server upon user interaction with the button 502a. Interaction between a user and the button (shown by line 504a) on the interactive overlay causes an interaction between the client and the server. The dotted lines are helpful in understanding that there must be user interaction which is shown visually in FIGS. 5A & 5B.

Upon receiving the button-triggered request, several other steps can take place, as shown in steps 408 and 410. Because these steps are optional, they are connected to the main portion of the diagram in FIG. 4A by a dotted line. As shown in step 408, the server generates a button-triggered request confirmation. The button-triggered request confirmation is generated in response to the button-triggered request and serves to confirm receipt of the button-triggered request. The server, as shown in step 410, then causes the button-triggered request confirmation to be sent to the user by way of, for example, an email or text message. The button-triggered request confirmation can be sent to any type of electronic address, where the electronic address is associated with a user or group of users (e.g., a family account having multiple users) according to a user ID. The button-triggered request confirmation can include, for example, a receipt for a purchase, a purchase confirmation link (e.g., a link to click that causes a purchase to be made), additional information about an item, and so on.

As with other embodiments discussed in this application, the method shown in FIGS. 4A & 4B can additionally include the step of sending audience attributes to the server. This optional step, which can be added to any of the methods described in this application, is shown in step 200 of FIG. 2. This step and attributes related to and included in the audience attributes are discussed above in more detail.

Because the method shown in FIGS. 4A & 4B is directed to embodiments where the video segment has a corresponding ad ID and the video segment itself is part of, for example, an episode of a show featuring a product-placement advertisement, the audience attributes can be used can be used to determine which ads to present to which users based on the audience attributes associated with those users. For example, if audience attributes indicate that a user is more likely to purchase sports equipment than fashion accessories, and a scene in a show includes both sports equipment and fashion accessories, then the user can be presented an interactive overlay allowing them to purchase the sports equipment instead of the fashion accessories, thereby increasing a likelihood of interaction.

Thus, specific systems and methods of delivering advertisement videos with an interactive overlay that, when interacted with, do not result in interruption of the advertisement video have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A computer-implemented method of delivering advertisements during a video stream, comprising:
   receiving, at a server from an advertiser, a set of advertisement attributes corresponding to an advertisement video having an associated ad ID, the set of advertisement attributes comprising an ad video resource locator;
   playing a video stream on a client, wherein the video stream comprises video data received from the server;
   sending, by the client, a content request and an audience attribute to the server, the content request comprising the ad video resource locator, the audience attribute comprising at least a geographic location and an expected interest;
   receiving, from the server, data comprising the advertisement video;
   playing, by the client, the advertisement video in the video stream that corresponds to the audience attribute;
   displaying, by the client on a display, an interactive overlay over the advertisement video, while the video stream is playing, wherein the interactive overlay includes a product-interaction button;
   detecting, by the client, a user interaction with the product-interaction button, and continuing the playing of the video stream while also generating, in a response to the detection of a user interaction, a purchase request comprising:
      a user ID, wherein the user ID is associated with user payment information and a user address;
      the ad ID;
      an engagement type; and
   sending, to the server, by the client, the purchase request.

2. The method of claim 1, further comprising receiving, from the server, a purchase request confirmation at an electronic address associated with the user ID.

3. The method of claim 1, wherein the purchase request further comprises an ad name and a sponsor name.

4. The method of claim 1, wherein the engagement type is defined as at least one of: an instant-buy type, a buy-later type, or a save type.

5. A computer-implemented method of delivering advertisements during a video stream, comprising:
- receiving, at a server from an advertiser, a set of advertisement attributes corresponding to an advertisement video having an associated ad ID, the set of advertisement attributes comprising an ad video resource locator;
- playing a video stream on a client, wherein the video stream comprises video data received from the server;
- sending, by the client, a content request and an audience attribute to the server, the content request comprising the ad video resource locator, the audience attribute comprising at least a geographic location and an expected interest;
- receiving, from the server, data comprising the advertisement video;
- playing, by the client, the advertisement video in the video stream that corresponds to the audience attribute;
- displaying, by the client on a display, while the video stream is playing, an interactive overlay over the advertisement video, wherein the interactive overlay includes a product-interaction button, and the product-interaction button occupies an area also occupied by the at least one item; wherein the product-interaction button has a shape that is defined according to at least one item shown in the advertisement video; wherein the at least one item is rendered at a first location on the display; wherein the product-interaction button is positioned at a second location on the display, the second location being substantially the same as the first location;
- detecting, by the client, a user interaction with the product-interaction button, wherein the user interaction comprises input to a peripheral device coupled with the client, and generating, in response to the detection, a purchase request comprising:
  - a user ID, wherein the user ID is associated with user payment information and a user address;
  - the ad ID;
  - an engagement type;
- sending, to the server, the purchase request; and
- wherein the user interaction with the product-interaction button does not cause interruption of the playing of the video stream on the client.

6. The method of claim 5, further comprising receiving, from the server, a purchase request confirmation at an electronic address associated with the user ID.

7. The method of claim 5, wherein the button-triggered request further comprises an ad name and a sponsor name.

8. The method of claim 5, wherein the product-interaction button is rendered to have the same shape and size as the at least one item.

* * * * *